Feb. 1, 1966     J. P. RENSHAW     3,232,041

ROTARY MOTOR

Filed Nov. 23, 1962     3 Sheets-Sheet 1

INVENTOR.
JOHN P. RENSHAW
BY
Townsend and Townsend
ATTORNEYS

Feb. 1, 1966 J. P. RENSHAW 3,232,041
ROTARY MOTOR
Filed Nov. 23, 1962 3 Sheets-Sheet 2

INVENTOR
JOHN P. RENSHAW

BY Townsend and Townsend
ATTORNEYS

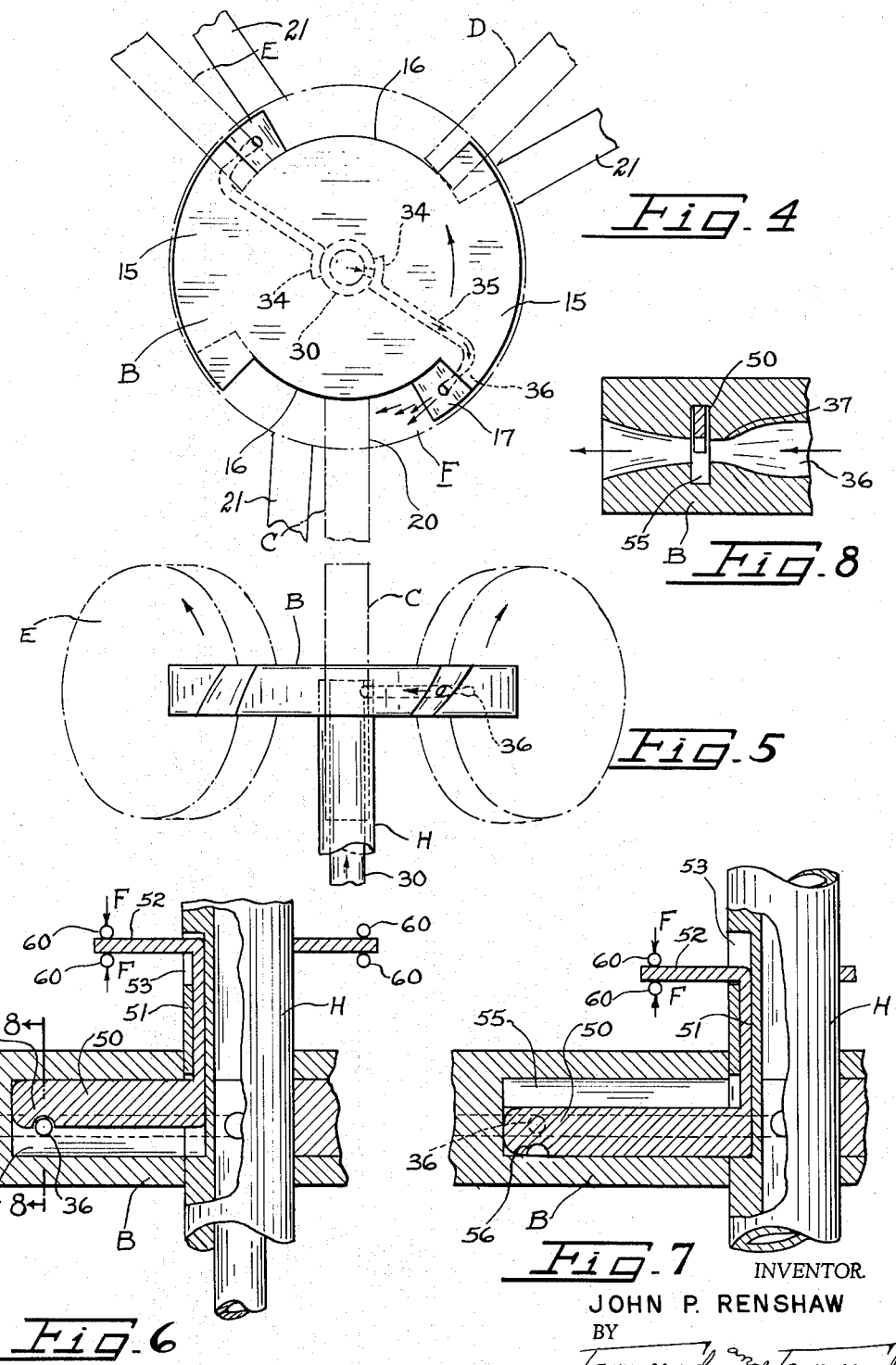

United States Patent Office 3,232,041
Patented Feb. 1, 1966

3,232,041
ROTARY MOTOR
John P. Renshaw, 340 Pine St., San Francisco, Calif.
Filed Nov. 23, 1962, Ser. No. 239,615
10 Claims. (Cl. 60—6)

This invention relates to a rotary type internal combustion engine. More specifically, the invention relates to an improvement in my United States Patent No. 3,012,551, issued Dec. 12, 1961 for Rotary Engine and my copending United States patent applications Ser. No. 127,431, filed July 10, 1961 for Positive Displacement Energy Converting Device; Ser. No. 152,349, filed Nov. 14, 1961 for Adjustable Valving Arrangement for Positive Displacement Rotary Type Energy Converting Devices; and Ser. No. 166,791, filed Jan. 17, 1962 for Rotary Type Positive Displacement Energy Converting Device.

The type of engine referred to basically includes a pair of rotating disk like members in which one of the disks functions primarily as a power disk and is formed with projections and cut-out portions on the peripheral edge of the disk. The other disk is formed with complementary cut-out and projecting portions which are arranged to alternately intersect projecting and recessed portions respectively of the power disk. The side of the projection of the second or abutment disk forms an abutment so that a chamber can be created between the side of the abutment disk and the rear or rearward edge of the raised portion of the power disk within which pressurized gas can act to cause rotation of the power disk.

In this type of an engine the abutment and power disks are enclosed in chambers and various gas communicating passageways are arranged to provide the fluid communication into the chambers. This type of engine in its detail of gas transfer and the like is completely disclosed in the aforesaid Patent No. 3,012,551 and patent applications Ser. Nos. 127,431, 152,349 and 166,791.

In similar types of engines in the prior art the edges of the power disk and abutment disk were virtually smooth and the timing of the two disks generally controlled by external gear drives. In the aforesaid Patent No. 3,012,551 there is provided intermeshing gear teeth between the two disks which function to time the action of the disks and to cause them to be interdriven.

In the present invention teeth similar to the teeth shown in Patent No. 3,012,551 can be provided on the periphery of the power and the abutment disks. However, there may alternately be provided an external gear drive which provides the functions of timing and inter-driving the two disks.

The peripheral edges of the power disk and the abutting valve disk are spaced slightly from one another to compensate for thermal expansion, yet provide a degree of labyrinth gas-sealing thereby allowing non-binding rotation and minimal frictional resistance between disks, slight spacing is also allowed between the outer surface of each disk and the inner surface of the enclosing chambers in order to allow free rotation. Under normal operating conditions the compressed gas will leak through these spaces during the power stroke, resulting in decreased efficiency and power output.

This invention provides a means for emanating a high velocity gas flow from the rear face of the power disk projection, and directing the gas toward a solid chamber wall such that a turbulent gas motion is set up which has the effect of reducing the static gas pressures and flows exerted outwardly along the spacing junction between relatively rotating portions of the engine, thereby providing increased turbulent sealing against static gas leakage from within the chamber.

The incoming high-velocity mass of gas directed into the chamber increases the static pressure within the chamber, resulting in rotational force moments being exerted on the rear face of the projection of the relatively rotatable power disk. By emanating the high velocity gas flow from the rear face of the power disk projection, a reaction type thrust is also imparted, resulting in dynamic rotational force moments being added to the static force moments, thereby increasing the power output and efficiency of the motor. Because of this feature lower chamber pressure can be maintained which also decreases the force tending to create gas leakage.

As the gas density increases, the increasing static pressure head reduces the velocity of input gas.

In this invention the high gas velocity input is high enough to maintain controlled turbulency in the chamber during the expansion cycle. Because of this feature a continuous turbulent seal is maintained between spaced parts to inhibit gas leakage.

It is another object of this invention to provide a control valve which will selectively vary the amount of gas emanation while maintaining relatively high velocities thereby retaining the advantages of high velocity gas for both thrust and turbulent sealing purposes.

Other objects, features and advantages of this invention will become apparent upon reading the following detailed specification and referring to the accompanying drawings in which:

FIG. 4 is a top plane of the power disk of a second embodiment of this invention and includes the side view of the three valving disks in which the high velocity gas flow is emanated directly from the rear of a power disk projection.

FIG. 5 is a side view of FIG. 3.

FIG. 6 is a cross-section schematic illustration of a sliding inlet valve in the open position.

FIG. 7 is a partial schematic illustration of the valve of FIG. 6 in the closed position.

FIG. 8 is a sectional view of the high velocity nozzle and valve taken along line 8—8 of FIG. 6.

Figure 2:
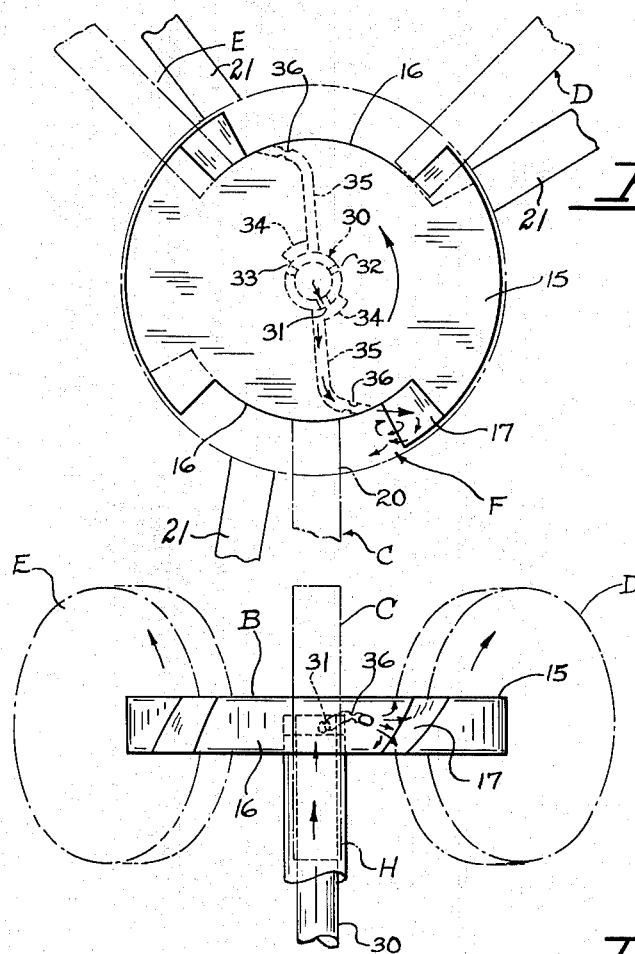
FIG. 2 is a top plane of the power disk including the side plane of three adjacent valving disks in which high velocity gas flow is emanated from the rear of a power disk projection by deflection.

In engines of the character in which this invention is useful there is an external housing in which power is generated by the inter-cooperation of a power disk and an abutting valve disk in which the forces of a high pressure gas, confined within a sealed expansion chamber, cause rotational movement of the power disk.

Referring to the drawings there is provided such an engine of the rotary type having an external housing A in which power is generated by the inter-cooperation of a power disk B and an abutment disk C in which the forces of both high pressure and high velocity gas in a sealed pressure or expansion chamber generally indicated in the area F, hereinafter called the expansion chamber, cause power disk B to be rotated.

Power disk B is cut with a reduced diameter section and an enlarged diameter section to form two outer radius segments 15 and two inner radius segments 16.

Figure 1:
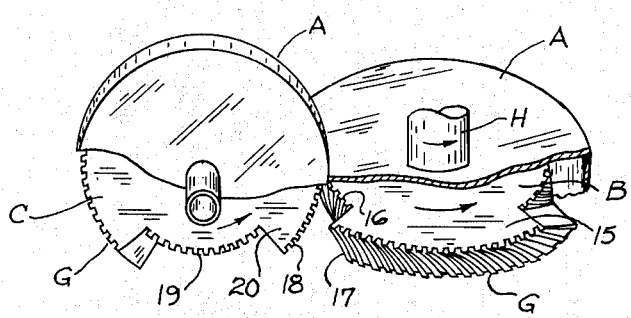
FIG. 1 is a perspective view of the power source in which part of the outer housing is broken away illustrating the abutting power and valve disk.
Figure 1A:
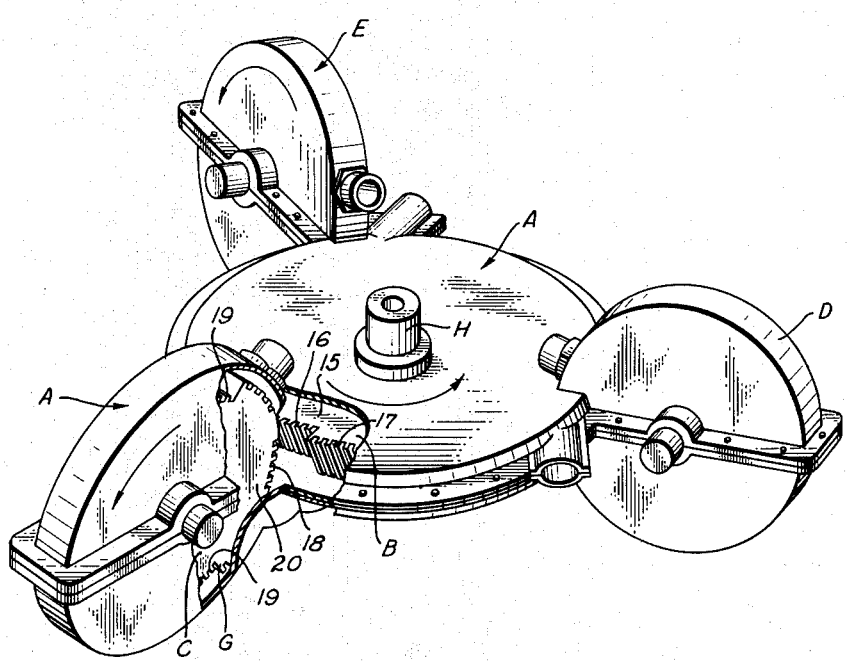
FIG. 1a is a perspective view with a section broken away, showing a three-phased motor arrangement.

Abutment disk C is similarly formed with outer radius segments 18 and inner radius segments 19. The two disks are timed and inter-driven by a peripheral gear drive mechanism, generally indicated at G and shown schematically in FIG. 1.

The timing for such enlarged radius segment 18 of the abutment disk will be in mating relationship with the smaller radius segment 16 of power disk B and the smaller radius segment 19 of the abutment disk will be in mating relationship with the larger radius segment 15 of abutment disk B.

Expansion chamber F is formed during the interval when the larger radius segment 18 is mated with the smaller radius segment 16 so that the side wall 20 of abutment C and the rearward edge 17 of larger radius segment 15 form two opposed surfaces against which high pressure gas within the combustion chamber can exert force which will contribute to rotation of power disk B.

Housing A is arranged to completely enclose the area around chamber F in the manner as specifically taught in Patent No. 3,012,551. Exhaust gases are also expelled through the exhaust ports 21 and intake gases can be communicated in timed relation into ports in the manner as taught in the aforesaid patent.

Suitable gearing means may be provided for driving the disks in timed relationship to one another and can be either the gear means along the periphery or the external driving of the aforementioned patent or co-pending applications.

In one type of gearing means helical teeth can be provided along the outer periphery of each disk B through E and are oriented to mesh with one another at the abutting surfaces, and gear ratio and characteristics being sufficient to insure timed mating of the enlarged diameter sections with the reduced diameter sections. Transfer between sections occurs along the slanting faces 17 and 21 which are oriented at the same angle as the gears, this being described in U.S. Patent No. 3,012,551.

Figure 3:
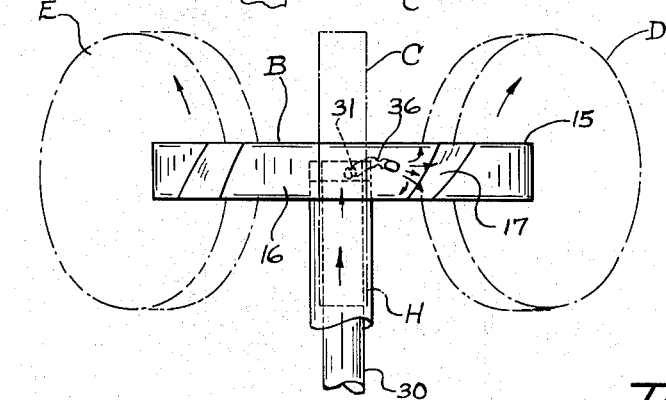
FIG. 3 is a side view of FIG. 1.

Energy in the form of compressed air or gas is supplied to chamber F through an inlet valve and passageway located within power disk B. As illustrated in FIGS. 2 and 3, centrally located hollow supply tube 30 has three outlet ports 31, 32 and 33 located about its circumference. As chamber 34 is rotated into aligned position adjacent the non-rotatable supply tube 30 the compressed gas transfers from tube outlet ports 31 into the expansion chamber via chamber 34 and gas passageway 35.

High velocity outlet orifice 36 is located at one end of passageway 35, and is oriented through the periphery of inner radius segment 16 to direct the inlet gas against slanting rearward face 17 of enlarged segment 15 at an incident angle. Constricted throat portion 37 of converging-diverging nozzle 36 increases the gas flow velocity just prior to injection into chamber F. Gas input into the pressure head built up within the chamber by the increasing gas density is maintained due to the higher pressure of gas input before the nozzle so that a relatively high velocity gas input is maintained throughout the power stroke or cycle.

The static gas pressure head built up within chamber F by the increasing mass of injected gas exerts an effective, useful force upon slanting face 17 of enlarged segment 15 in a direction generally tangential to the rotating power axis of disk B, thereby setting up a force moment.

The high velocity gas flow is directed into the chamber at such an angle that the gas stream will tend to directly strike a solid chamber wall rather than the spacing between relatively rotatable motor portions. As the gas flow strikes slanting face 17 and emanates rearward into the chamber, it exerts dynamic reaction forces upon this face impelling it in advancing rotary motion about the power axis. This adds to the static pressure force moment.

The gas striking slanting face 17 is deflected into a turbulent high velocity swirling motion within chamber F. This gas motion along the chamber walls has the effect of reducing the static gas pressures which are directed normal to the chamber walls and along the plane of the spaces between the disks and outer housing A. A turbulent seal is thereby created which reduces gas leakage without the need for packing or piston rings.

Each of the other ports 32 and 33 operates in the same manner as ports 31 thereby directing gas into each expansion chamber F as it forms between rear face 17 of the advancing enlarged segment 15 and side wall 20 of the abutting valve disks D and E. This arrangement gives a rotary engine having six power strokes per cycle and results in uniform, relatively non-pulsating energy output.

As illustrated in FIGURES 4 and 5, another embodiment of the invention includes a similar centrally located high velocity valved supply tube 30 and chamber 34. Inlet passageways 35 and 36 are, however, directed into expansion chamber F from slanting rear face 17 of enlarged segment 15. As the gases are emanated at high velocity from rear face 17 they exert a jet-like reaction force in an effective direction substantially tangential to the power axis of rotation, thereby dynamically setting up a force moment about this axis. Dynamic reaction force, in addition to the static pressure resulting from the increasing gas mass, gives increased output performance of the engine.

The walls of expandable chamber F exert a confining influence on the high velocity stream and define the path of gas travel.

The rearwardly emanated gases, deflected from solid side wall 20 of abutting valve disk C, travel in a direction substantially parallel to the chamber walls at an angle to the plane of the spacing, thereby creating high velocity turbulence and sealing much in the same manner as previously described.

A sliding valve 50 is positioned in constricted throat 37 of converging-diverging nozzle 36 so that the amount of inlet gas per unit of time can be controlled so as to maintain high velocity. This permits control over the velocity of the injecting gas and the speed of rotation of the power source while retaining the advantages of the high velocity gas injection. As illustrated in FIGURES 6, 7 and 8 sliding valve plate 50 and linkage arm 51 are enclosed completely within power disk B and power shaft H except for upward projecting control lever ring 52. Control lever ring 52 receives a control signal indicated generally by the arrows F acting upon bearing means 60 and is moved axially in slot 53 toward power disk B. The connecting linkage 51 also slides axially and moves connected flat valve plate 50 within hollow rectangular slot 55 provided in power disk B. The axial movement of flat valve plate 50 serves to position semi-circular indentation 56 within the throat 37 of the inlet nozzle 36 thereby decreasing the amount of gas injection into expansion chamber F per unit of time, resulting in a decrease in the engine speed and power supplied. By applying a signal F in the opposite direction, indentation 56 moves in the opposite direction and the size of throat 37 is increased, thereby speeding up the power source. From this it can be seen that the motor rotary speed can be varied while still maintaining high velocity gas emanation throughout the entire speed range, thereby taking advantage of the reaction air pressure, jet-propulsion effect and the swirling turbulent sealing action at all speeds.

Although the foregoing invention has been described in some detail by way of illustration and example for purposes of clarity of understanding, it is understood that certain changes and modifications may be practiced within the spirit of the invention as limited only by the scope of the appended claims.

What is claimed:

1. In an improved rotary power source of the type having an enclosed housing containing a power disk and valving disk spaced slightly therefrom and each rotatable in different planes, each said disk includes an enlarged radius segment and a reduced radius segment, and timing means to align said disks with the enlarged peripheral segment of the valving disk intermeshed with the reduced radius segment of the power disk to form an expansion chamber within said housing between the power and valving disk, the improvement comprising: jet means on said power disk directed to direct gas flow from the rearward face of the enlarged radius segment of the power disk into the expansion chamber and venturi means to create a high velocity pressure head at the jet means having greater pressure than the pressure within the expansion chamber whereby the power disk is driven by the combination of jet force emanating from the power disk and gas pressure within the expansion chamber.

2. The power source of claim 1 in which the jet means is on the peripheral surface of the reduced radius segment of the power disk and directed to emanate gas into the chamber for deflection of high velocity gas flow from the rearward face of said power disk enlarged radius segment.

3. The power source of claim 1 in which said jet means is directed to emanate at an angle from said rearward face sufficient to deflect the emanated gas into turbulent motion within the chamber to reduce escape of pressurized gas from the chamber through any spacing between the relatively rotatable disks and housing.

4. The power source of claim 1 in which said jet means includes a nozzle forming a converging diverging passageway.

5. The power disk of claim 1 in which said jet means includes a nozzle forming a converging diverging passageway and means to vary the size of said passageway at least one point to vary the volumes of gas flow through the jet means while maintaining the gas flow at high velocity.

6. The power source of claim 1 in which the jet means is on the rearward face of the enlarged radius segment of the power disk and directed to emanate gas into the expansion chamber directly from the rearward face of the power disk projection.

7. A rotary engine of the type having an outer housing slightly spaced from and enclosing peripheral abutting power and valving disks, each disk being rotatable in different planes, the peripheral abutting edges of each disk including an enlarged radius segment and a reduced radius segment, and means to rotate said disks in a timed relationship of the peripheral segments and to intermesh them with one another to form an expansion chamber within the outer housing and between the power valving disks, the improvement comprising: a gas inlet orifice formed in the power disk directed to emanate high velocity gas flow from the rearward face of the enlarged radius segment of the power disk to exert a reaction force upon said enlarged radius segment face and create a force moment about the power disk axis of rotation, and said chamber walls being operable upon the emanated gas flow to create high velocity turbulent gas motion within the chamber to reduce escape of pressurized gas through the spacing between disks and housing whereby the power disk is driven in rotary motion by the combined reaction force moment and the pressurized chamber gas.

8. The power source of claim 7 in which the orifice is in the power disk enlarged radius segment and directed to emanate gas flow directly into said chamber in a direction substantially tangential to power disk rotation, the expansion chamber defined by the outer housing, the enlarged radius segments of the power disk, and the abutting valving disk being operable to confine and deflect the gas flow into turbulent motion within the chamber.

9. The rotating power source of claim 7 in which the inlet orifice is in the periphery of the power disk reduced radius segment and directed to emanate high velocity gas flow into the chamber by deflection.

10. The power source of claim 7 in which the inlet orifice includes a valve body movably positioned to adjust the orifice cross-section at one point to vary the amount of inlet gas flow while yet maintaining high velocity gas flow.

References Cited by the Examiner
UNITED STATES PATENTS

| | | | |
|---|---|---|---|
| 726,228 | 4/1903 | Lewis | 91—97 |
| 2,511,441 | 6/1950 | Loubiere. | |
| 2,625,008 | 1/1953 | Crook | 60—35.6 |
| 2,920,610 | 1/1960 | Breelle | 123—13 |
| 3,012,551 | 12/1961 | Renshaw | 123—13 |
| 3,058,372 | 10/1962 | Robinson | 60—35.5 X |

SAMUEL LEVINE, *Primary Examiner.*

JULIUS E. WEST, EDGAR W. GEOGHEGAN,
*Examiners.*